United States Patent Office 3,081,816
Patented Mar. 19, 1963

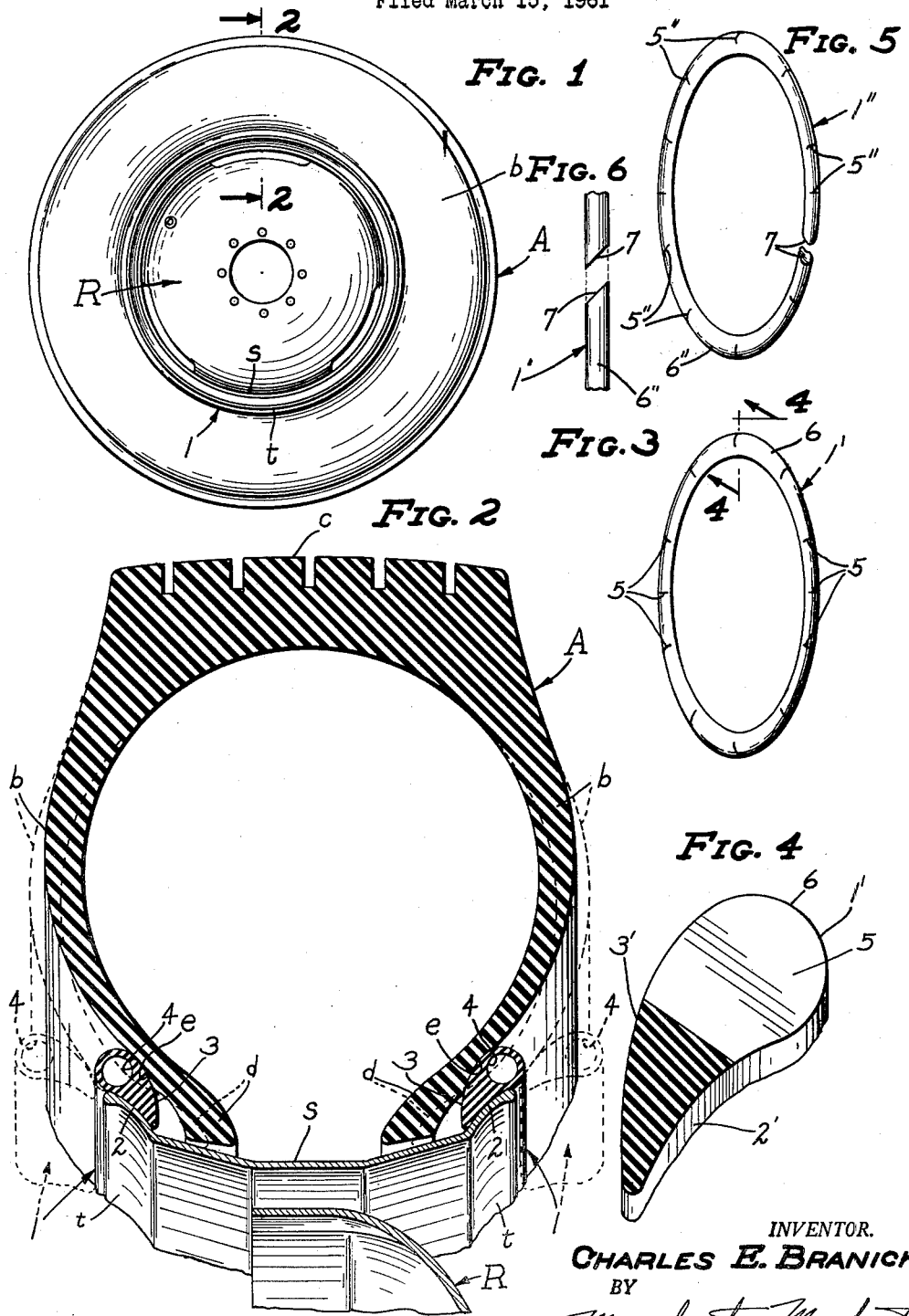

3,081,816
SEALING RING FOR MOUNTING TUBELESS
PNEUMATIC TIRES
Charles E. Branick, % Branick Manufacturing Co.,
Fargo, N. Dak.
Filed Mar. 15, 1961, Ser. No. 95,959
4 Claims. (Cl. 157—1.1)

This invention relates generally to tire mounting devices and equipment, and more particularly it relates to a sealing ring for use in mounting tubeless pneumatic tires on the rim of a wheel.

It is well known in the art to which this invention pertains that tubeless pneumatic tires, and particularly the larger sizes thereof, require auxiliary mounting equipment for creating a seal between the beads of a tire and the rim flange of the wheel. This is because the tire beads do not normally position themselves with respect to the wheel rim flanges in a manner which will create a seal therebetween and permit inflation of the tire. Therefore, it has become the practice in the art to apply an initial force to the tire casing so as to create a seal between the tire beads and the rim flanges of the wheel. However, such previously known practices have not generally produced optimum satisfaction either because they were characterized by the use of expensive devices or because they materially interfered with the proper positioning of the tire beads with respect to the rim flanges of the wheel.

In light of the above introductory comments, it is an important object of this invention to provide a sealing ring which is adapted to be mounted on and encircle a wheel rim intermediate the bead of an uninflated tubeless tire loosely mounted on the wheel rim and the adjacent bead-engaging rim flange of the wheel whereby to provide a seal between the rim and the bead portion of the tire so as to permit inflation of the tire.

Another object of this invention is the provision of an annular sealing ring for use in mounting tubeless pneumatic tires on the rim of a wheel, which sealing ring is extremely easy to position and which does not require the use of air compressors or other auxiliary equipment or expensive tools.

A still further object of this invention is the provision of a sealing ring for use in mounting tubeless pneumatic tires which is automatically ejected from its position between the tire bead and the rim flange upon sufficient inflation of the tire, such automatic ejection being accomplished by the addition of resiliency to said sealing ring.

Another important object of this invention is the provision of a sealing ring for rise in mounting tubeless pneumatic tires on the rim of a wheel which sealing ring is split so as to permit the removal of the same from the inner side of a wheel when the wheel is mounted on the axle of a vehicle, and which split sealing ring is also provided at the split thereof with means for creating a seal between the split portions thereof when the same is in its above noted operative position intermediate a tire and the adjacent wheel rim.

Other objects of this invention reside in the provision of a sealing ring for use in mounting tubeless pneumatic tires which is economical to manufacture, simple but extremely durable in construction, and highly efficient in providing satisfactory performance of its objects and purposes.

The foregoing and other objects and advantages of this invention will become apparent from the following detailed specification, appended claims and attached drawings.

Referring to the drawings wherein like reference characters indicate like parts or elements throughout the several views:

FIG. 1 is a view in side elevation of my invention and showing the same in its sealing position with respect to a tire casing and a wheel;

FIG. 2 is an enlarged view in section taken on the line 2—2 of FIG. 1, and showing another position of my invention in dotted lines;

FIG. 3 is a view in perspective of an alternative embodiment of my invention;

FIG. 4 is an enlarged view in section taken on the line 4—4 of FIG. 3;

FIG. 5 is a view in perspective similar to FIG. 3 but showing another embodiment of my invention; and FIG. 6 is an enlarged detail view of a portion of FIG. 5.

Referring with greater particularity to the drawings, a tubeless pneumatic tire casing is represented in its entirety by the reference letter A, said tire casing A including side walls b, a tread portion c, and annular bead portions d. Also, a conventional vehicle wheel is represented in its entirety by the reference letter R, said wheel R including a rim portion s which defines rim flanges t. The present invention comprises an annular sealing ring, represented generally by the reference numeral 1, which is designed for use in mounting a tubeless pneumatic tire, such as A, on the rim of a wheel, such as R. As seen particularly in FIGS. 1 and 2, the sealing ring 1 is adapted to be mounted on and encircle the wheel rim portion s of the wheel R intermediate the bead d of an uninflated tire A and the adjacent rim flange t of the wheel R. It is noted that the sealing ring 1 is received on the wheel R when the tire A is in an uninflated condition.

The annular sealing ring 1 is preferably formed from a resilient material, such as rubber or plastic, so as to permit its easy reception on the rim s of the wheel R. The cross-sectional configuration of the sealing ring 1 may be described as generally wedge or sector-shaped or tear-shaped so as to define generally radially outwardly diverging inner and outer surface portions 2, 3, respectively. As seen particularly in FIG. 2, a cross-section of this ring 1, is actually of inverted tear-drop shape with the inner surface portion 2 of the sealing ring 1 generally arcuately and concavely formed, and the outer surface portion 3 of the sealing ring 1 is generally arcuately and convexly formed. In accordance with my invention, and when the sealing ring 1 is positioned as shown by full lines in FIG. 2, the inner surface portion 2 of the sealing ring 1 is adapted to engage the adjacent flange t of the rim s, and the outer surface portion 3 of the sealing ring 1 is adapted to engage the adjacent side e of the bead portion d of the tire A whereby to provide a seal between the rim s and the bead portion d of the tire A. Although for the purpose of simplification of the explanation of my invention the above has only included a description of a single sealing ring 1, it is obviously desirable in most cases to use a pair of the sealing rings 1, one each of which is disposed adjacent the opposite rim flanges t of the wheel R, as shown particularly in FIG. 2.

For the purpose of adding resiliency to the sealing rings 1 whereby to permit the ejection thereof over the rim flanges t of the wheel R upon sufficient inflation of the tire A, the sealing rings 1 are formed to define what may be generically termed recess means. In one embodiment of my invention, shown in FIG. 2, such recess means comprises a void-forming hollow portion 4 defined by each of the sealing rings 1 and extending in a generally circumferential direction with respect to the axis of the sealing ring 1. Of course, the hollow portion 4 of each of the sealing rings 1 may extend completely around the ring 1, or it may also comprise a plurality of circumferentially spaced sections. As seen particularly in FIGS. 3 and 4, in an alternative embodiment of my invention the above described recess means may comprise a plurality of circumferentially spaced generally radially outwardly opening slits or sipes 5 defined by each of the sealing rings 1'. Preferably, and as shown in FIG. 4, each of the sipes 5 extends generally cross-sectionally halfway through the sealing ring 1' from the radially outer portion 6 thereof.

In another embodiment of my invention shown in FIGS. 5 and 6, the sealing ring 1" is split so as to define opposed angularly shaped end portions 7 so as to permit the removal of the split sealing ring 1" from the inner side of a wheel R when the wheel R is mounted on the axle of a vehicle, not shown. When the split sealing rings 1" are placed in their operative positions intermediate the beads d of the tire A and the rim flanges t of the wheel R, the end portions 7 engage one another so as to provide a seal therebetween. Of course, other sealing means could also be provided for effecting a seal between the angularly formed end portions 7. It should be noted that the alternative embodiments of my invention described above and shown in FIGS. 3–6 correspond in all respects not specifically enumerated to the above described embodiment of my invention shown in FIGS. 1 and 2, and the parts or elements of said alternative embodiment shown in FIGS. 3 and 4 which correspond to like parts or elements in FIGS. 1 and 2 are denoted in said FIGS. 3 and 4 by the use of the same reference characters with prime marks added thereto, and the parts or elements of the embodiment shown in FIGS. 5 and 6 which correspond to like parts or elements in FIGS. 1 and 2 are denoted in said FIGS. 5 and 6 by the use of the same reference characters with double prime marks added thereto.

Having specifically described my invention, the use and operative simplicity thereof will be set forth hereinafter. After the tire A, which is to be mounted on the wheel R, is placed on the rim portion s of the wheel R in an uninflated condition, the position thereof will be substantially as shown by full lines in FIG. 2. It is generally common knowledge that the mere placing of a tubeless tire, such as A, on the rim of a wheel, such as R, does not create a sufficient seal between the beads d of the tire A to permit the inflation of the tire A. Therefore, this invention teaches the placement of a sealing ring 1 on each side of the wheel R intermediate the beads d of the tire A and the rim flanges t of the wheel R. Such positioning of the sealing rings 1 obviously creates a seal between the beads d of the tire A and the rim flanges t of the wheel R whereby to permit the subsequent inflation of the tire A. Upon inflation of the tire A, the beads d thereof are obviously pushed in axially outwardly opposite directions, whereupon they become seated against the rim flanges t of the wheel R. Upon such inflation of the tire A, the resiliency of the sealing rings 1 permits them to be automatically ejected from the wheel R by the force exerted against the sealing rings 1 by the outwardly moving beads d. Although the usual positioning of the sealing rings 1 will be as shown in FIGS. 1 and 2, it is within the purview of this invention to include other positions thereof, such as the positioning of a pair of sealing rings 1 in side by side relationship on one side of the wheel R. Such a positioning of the sealing rings 1 might be used where it is possible to seat one bead d of the tire A against the rim flange t on one side of the wheel R by the application of manual force. It is noted that in order to facilitate the easy reception and for rejection of the sealing rings 1 with respect to the rim flanges t, either the rim flanges t or the sealing rings 1 may be coated with a suitable lubricant, not shown. Of course, the above explanation also applies with respect to the sealing rings 1' and 1".

This invention has been thoroughly tested and found to be completely satisfactory for the accomplishment of the above objects; and while I have shown and described above preferred embodiments thereof in which the principles of the present invention have been incorporated, I wish it to be specifically understood that the same may be modified without departure from the scope and spirit of the appended claims.

What I claim is:

1. An annular sealing ring for use in mounting tubeless pneumatic tires on the rim of a wheel, said sealing ring being adapted to be mounted on and encircle a wheel rim intermediate the bead of a uninflated tubeless tire loosely mounted on said wheel rim and the adjacent rim flange of said wheel, said sealing ring being cross-sectionally generally tear-shaped and having generally diverging inner and outer surface portions the latter of which is adapted to engage the adjacent side of the bead portion of said tire and the former of which is adapted to engage the adjacent flange of said rim whereby to provide a seal between the rim and the bead portion of the tire so as to permit inflation of said tire, said inner surface portion being generally concavely formed and said outer surface portion being generally convexly formed, said sealing ring defining recess means for adding resiliency to said ring whereby to permit the ejection thereof over said rim flange upon sufficient inflation of said tire, said recess means comprising a plurality of circumferentially spaced generally radially outwardly opening sipes defined by said sealing ring.

2. An annular sealing ring for use with a wheel having an annular convex rim flange, an uninflated tubeless tire loosely mounted on said wheel with a generally concave bead portion of the tire disposed adjacent to but spaced from the wheel rim flange, said annular sealing ring being resilient and having a radially inwardly projecting wedge portion to be disposed intermediate the tire bead and the adjacent wheel rim flange, said sealing ring being cross-sectionally generally tear-shaped and having generally diverging sealing surfaces, one sealing surface of said sealing ring being generally concavely formed and the other sealing surface being generally convexly formed, said convex sealing surface of said sealing ring engaging and sealing against the adjacent concave bead portion of the tire and said concave sealing surface of the sealing ring engaging and sealing against the adjacent convex rim flange whereby to provide a seal between the rim flange and the tire bead so as to permit inflation of the tire, the radially outer portion of said sealing ring defining means for adding resiliency to the ring whereby to permit the ejection thereof over said rim flange upon sufficient inflation of said tire.

3. The sealing ring of claim 1 in which said means comprises void-forming hollow portions defined by said ring and extending in a generally circumferential direction with respect to the axis of said sealing ring.

4. The device of claim 1 wherein said sealing ring is transversely split so as to define angularly formed cooperating end portions adapted to engage one another when said split ring is so positioned intermediate said tire and said wheel rim.

References Cited in the file of this patent

UNITED STATES PATENTS

| | | |
|---|---|---|
| 1,945,293 | Pierce | Jan. 30, 1934 |
| 2,792,057 | Schreiner | May 14, 1957 |
| 2,863,681 | Robbins | Dec. 9, 1958 |
| 2,874,759 | Ranallo | Feb. 24, 1959 |

FOREIGN PATENTS

| | | |
|---|---|---|
| 206,883 | Australia | Mar. 14, 1957 |